US012609830B2

(12) United States Patent
Chen

(10) Patent No.: US 12,609,830 B2
(45) Date of Patent: Apr. 21, 2026

(54) DEVICE SECURITY WITH ONE-WAY FUNCTION

(71) Applicant: Visa International Service Association, San Francisco, CA (US)

(72) Inventor: Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/692,026

(22) PCT Filed: Sep. 28, 2021

(86) PCT No.: PCT/US2021/052435

§ 371 (c)(1),
(2) Date: Mar. 14, 2024

(87) PCT Pub. No.: WO2023/055345

PCT Pub. Date: Apr. 6, 2023

(65) Prior Publication Data

US 2024/0356756 A1    Oct. 24, 2024

(51) Int. Cl.
*H04L 9/32* (2006.01)
*G06Q 20/32* (2012.01)
(Continued)

(52) U.S. Cl.
CPC ....... *H04L 9/3242* (2013.01); *G06Q 20/3278* (2013.01); *G06Q 20/3821* (2013.01);
(Continued)

(58) Field of Classification Search
None
See application file for complete search history.

(56) References Cited

U.S. PATENT DOCUMENTS 8,837,719 B2    9/2014  Reffe
9,087,187 B1*   7/2015  Doane ................... H04L 9/3236
(Continued)

FOREIGN PATENT DOCUMENTS

CN         104509027 A  *  4/2015  ........... H04L 9/3247
CN         113240145 A  *  8/2021  ....... G06Q 10/06311
(Continued)

OTHER PUBLICATIONS

"Salt (cryptography)", Wikipedia, Available online at https://en.wikipedia.org/w/index.php?title=Salt (cryptography)&oldid=753726369, Dec. 8, 2016, 3 pages.
(Continued)

*Primary Examiner* — Ali H. Cheema
(74) *Attorney, Agent, or Firm* — Kilpatrick Townsend & Stockton LLP

(57) ABSTRACT

A disclosed method includes receiving, by a first device from a server computer, a first hash value along with a plurality of other hash values, and a random value. The first hash value is generated by inputting at least a first credential and the random number into a hash function. The method includes reading a second credential from a second device operated by a second user, and generating a second hash value by inputting at least the second credential and the random value into the hash function. The method includes comparing the first hash value and the second hash value, and determining that the first hash value and the second hash value match. The method also includes validating an action of the second user when the first hash value and the second hash value match.

16 Claims, 4 Drawing Sheets

(51) Int. Cl.
    *G06Q 20/38*         (2012.01)
    *H04L 9/08*          (2006.01)
    *H04L 9/40*          (2022.01)

(52) U.S. Cl.
    CPC .......... *H04L 9/0861* (2013.01); *H04L 9/3239*
        (2013.01); *H04L 63/0853* (2013.01); *H04L*
        *2209/56* (2013.01)

(56)            References Cited

U.S. PATENT DOCUMENTS

| | | | |
|---|---|---|---|
| 9,119,069 B1 | 8/2015 | Vipond et al. | |
| 10,374,799 B2 | 8/2019 | Tamrakar et al. | |
| 10,579,995 B2 | 3/2020 | de Oliveira et al. | |
| 2001/0039620 A1* | 11/2001 | Berry | G06F 21/62 |
| | | | 713/193 |
| 2008/0235772 A1* | 9/2008 | Janzen | H04L 9/3226 |
| | | | 726/5 |
| 2010/0251358 A1* | 9/2010 | Kobayashi | G06F 21/79 |
| | | | 726/19 |
| 2011/0167487 A1* | 7/2011 | Wu | H04Q 11/0067 |
| | | | 726/7 |
| 2011/0246369 A1* | 10/2011 | de Oliveira | G06Q 20/40 |
| | | | 705/64 |
| 2013/0090088 A1 | 4/2013 | Chevsky et al. | |
| 2014/0189821 A1* | 7/2014 | Ying | H04W 12/068 |
| | | | 726/5 |

| | | | |
|---|---|---|---|
| 2016/0140542 A1 | 5/2016 | Hammad | |
| 2019/0205547 A1* | 7/2019 | Horvath | G06Q 20/3674 |
| 2020/0082124 A1* | 3/2020 | Pedersen | H04L 9/3226 |
| 2020/0169573 A1* | 5/2020 | Giladi | H04L 63/123 |
| 2020/0211002 A1* | 7/2020 | Steinberg | G06Q 20/385 |
| 2021/0034769 A1 | 2/2021 | Chen et al. | |
| 2021/0099306 A1* | 4/2021 | Sloane | H04L 9/3297 |
| 2021/0117671 A1* | 4/2021 | Decoux | G06V 20/80 |
| 2021/0232704 A1* | 7/2021 | Lim | B60R 25/00 |
| 2022/0114845 A1* | 4/2022 | Ryu | G06F 21/6245 |
| 2023/0224980 A1* | 7/2023 | Kopchinsky | H04W 76/10 |
| | | | 370/338 |
| 2024/0223384 A1* | 7/2024 | Guim Bernat | H04L 63/0823 |

FOREIGN PATENT DOCUMENTS

| | | | | |
|---|---|---|---|---|
| EP | 3319006 B1 | * | 6/2023 | ............ G06F 21/33 |
| JP | 2006195688 A | * | 7/2006 | |
| JP | 2021120821 A | * | 8/2021 | |
| WO | 2020205609 A1 | | 10/2020 | |

OTHER PUBLICATIONS

EP21959605.3 , "Extended European Search Report", Oct. 28, 2024, 9 pages.
PCT/US2021/052435 , "International Search Report and Written Opinion", Jun. 24, 2022, 9 pages.

* cited by examiner

DEVICE SECURITY WITH ONE-WAY FUNCTION

CROSS-REFERENCES TO RELATED APPLICATIONS

This application is the National Stage of International Application No. PCT/US2021/052435, filed Sep. 28, 2021, of which is herein incorporated by reference in its entirety.

BACKGROUND

User devices such as payment devices are being used to pay for ride fares in public transportation systems. Such devices can serve as evidence of payment of the ride fare. Ticket controllers need a mechanism to verify whether the cardholders used their cards to pay for their fares.

Conventional revenue inspection devices (RID) in the public transportation system are specially built and expensive. New technologies like tap-to-phone (TTP) solutions can use commercial-off-the-shelf (COTS) smartphones and TTP software to replace expensive proprietary RID devices. As TTP software runs on an open system like Android, iOS, these systems are susceptible to malware. TTP RID software needs to store hundreds or thousands of sensitive payment data (SPD) from riders' cards for inspection. Leakage of such SPD will lead to fraud in the payment ecosystem. Thus, a new technique needs to be developed to determine whether a rider's card has paid the fare against hundreds or thousands of records during an inspection.

Embodiments of the invention address these and other problems individually and collectively.

BRIEF SUMMARY

In one aspect of the present disclosure, in various implementations, a method may include: receiving, by a first device from a server computer, a first hash value along with a plurality of other hash values, and a random value, wherein the first hash value is generated by inputting at least a first credential and the random number into a hash function; reading, by the first device, a second credential from a second device operated by a second user; generating, by the first device, a second by inputting hash value at least the second credential and the random value into the hash function; comparing, by the first device, the first hash value and the second hash value, and determining that the first hash value and the second hash value match; and validating, by the first device, an action of the second user when the first hash value and the second hash value match.

In some embodiments, the method further comprises: storing, by the first device, the second credential in memory of the first device after reading the second credential from the second device and before generating the second hash value; and erasing, by the first device, the second credential from the memory of the first device after validating the action.

In some embodiments, at most, one credential exists in memory of the first device at one time.

In some embodiments, the method further comprises: comparing the second hash value to the other hash values and determining that the second hash value and the other hash values do not match.

In some embodiments, the second device is a card, and the first device is an NFC (Near-Field Communication) smartphone capable of reading the second device.

In some embodiments, the first hash value is generated by inputting a first credential, the random value, and an expiration date associated with the second device.

In some embodiments, the random value is determined by a random number generator in the server computer. The server computer uses it to generate hash values for a specific period or a transportation line.

In some embodiments, the random value is at least 16 bytes long.

In some embodiments, each of the first, second, and plurality of other hash values satisfies one or more data security requirements, including resilience against a dictionary attack.

In some embodiments, the first hash value is generated by inputting a first credential, the random value, an organization operator identifier, and an expiration date associated with the second device, wherein the organization operator identifier identifies an operator of the server computer.

In some embodiments, the hash function is a SHA256 hash function.

In some embodiments, the first hash value and the second hash value are each at least 32 bytes long.

In some embodiments, the first credential and the second credential are the same value.

In some embodiments, the first credential and the second credential are each at least 10 bytes long.

In another aspect of the present disclosure, a first device may comprise at least one processor and a non-transitory computer-readable medium. The non-transitory computer-readable medium includes instructions that, when executed by at least one processor, cause the first device to perform operations. The operations may include: receiving, by a first device from a server computer, a first hash value along with a plurality of other hash values, and a random value, wherein the first hash value is generated by inputting at least a first credential and the random number into a hash function; reading, by the first device, a second credential from a second device operated by a second user; generating, by the first device, a second hash value by inputting at least the second credential and the random value into the hash function; comparing, by the first device, the first hash value and the second hash value, and determining that the first hash value and the second hash value match; and validating, by the first device, an action of the second user when the first hash value and the second hash value match.

Yet another aspect of the present disclosure is directed to a method comprising: generating, by a server computer, a random value; generating, by the server computer, a plurality of hash values including a first hash value and other hash values, wherein the first hash value is generated by inputting at least a first credential and the random value into a hash function, and the other hash values are generated by inputting at least other credentials and the random value into the hash function; and transmitting, by the server computer, the plurality of hash values including the first hash value to the first device. The first device performs operations comprising: receiving from the server computer a plurality of hash values including the first hash value; reading a second credential from a second device operated by a second user; generating a second hash value by inputting at least the second credential and the random value into the hash function; comparing the first hash value and the second hash value, and determining that the first hash value and the second hash value match; and validating an action of the second user when the first hash value and the second hash value match.

In some embodiments, the server computer is operated by a transit agency.

In some embodiments, the first device is a mobile phone, and the second device is a card.

In some embodiments, the action is riding a transportation vehicle by a second user of the second device.

In some embodiments, the first hash value is generated by inputting the first credential, the random value, an organization operator identifier, and an expiration date associated with the second device, wherein the organization operator identifier identifies an operator of the server computer.

Further details regarding embodiments of the invention can be found in the Detailed Description and the Figures.

BRIEF DESCRIPTION OF THE DRAWINGS

Preferred and non-limiting embodiments of the invention may be more readily understood by referring to the accompanying drawings in which.

TERMS

Figure 1:
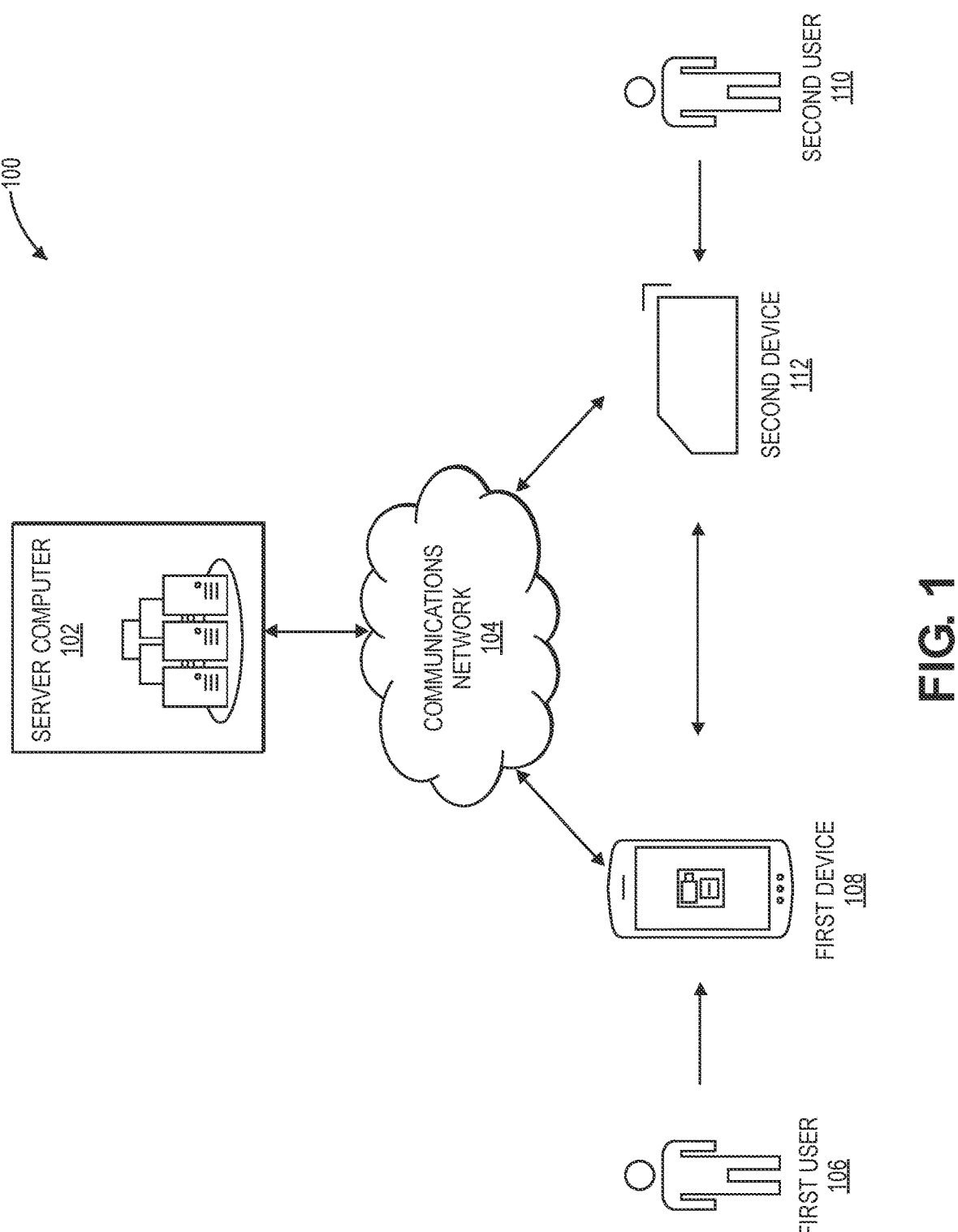
FIG. 1 is a schematic diagram that illustrates a system in accordance with various embodiments of the disclosure.

Before discussing specific embodiments, some descriptions of some terms that are used are provided below.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile communication device such as a mobile phone, a smartphone, a card (e.g., a payment card such as credit, debit, or a prepaid card) with magnetic stripes, contact chips, or contactless elements (e.g., including contactless chips and antennas), a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi®, Wi-Max®, or any other communication medium that may provide access to a network such as the Internet or a private network.

A "mobile communication device" may comprise any suitable electronic device that may be transported and operated by a user, which may also optionally provide remote communication capabilities to a network. Examples of remote communication capabilities include using a mobile phone (wireless) network, wireless data network (e.g., 3G, 4G or similar networks), Wi-Fi®, Bluetooth®, Bluetooth® Low Energy (BLE), Wi-Max®, or any other communication medium that may provide access to a network such as the Internet or a private network. Examples of mobile communication devices include mobile phones (e.g., cellular phones), PDAs, tablet computers, netbooks, laptop computers, wearable devices (e.g., watches), vehicles such as automobiles and motorcycles, personal music players, specialized hand-held readers, etc. A mobile communication device may comprise any suitable hardware and software for performing such functions. It may also include multiple devices or components (e.g., when a device has remote access to a network by tethering to another device—i.e., using the other device as a modem—both devices taken together may be considered a single mobile communication device).

A "contactless" communication may be communication in which data is exchanged between two devices without the need for the devices to be physically coupled. Without limiting the generality of the foregoing, "contactless" communication can include data transmissions by near-field communication (NFC) transceiver, laser, radiofrequency, infrared communications, or other radio frequency or wireless communication protocols such as Bluetooth®, Bluetooth® Low Energy (BLE), Wi-FI®, iBeacon®, etc.

An "application" may be a computer program that is used for a specific purpose. Examples of applications may include payment applications, transit applications, secure data access applications, banking applications, digital wallet applications, event ticketing applications, loyalty rewards applications, etc.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information. A payment credential may also include a payment token, which can be a substitute for a payment account number.

DETAILED DESCRIPTION

The approaches disclosed herein can achieve sensitive payment data (SPD) security in tap-to-phone (TTP) software on commercial-off-the-shelf (COTS) devices without using an encryption scheme. For example, the one-way function processed SPD is used for revenue inspection on EMV contactless cards in transit systems. This mechanism "scrambles" the SPD, preventing the processed result from being used in the payment ecosystem to create fraud transactions while maintaining its characteristic for inspection purposes.

In various embodiments, a server computer generates at first a random value as a seed value to be used in a one-way function (e.g., a secure hash function). The server computer then receives credentials from users who have paid fares and generates hash values by inputting the credentials and the random value into the secure hash function. Further, the server computer transmits the credentials to an inspection device.

In various embodiments, the inspection device reads a credential from a user's card using a tap-to-phone (TTP) software loaded onto the inspection device and stores the credential in the inspection device's memory. The inspection device generates a hash value by inputting the credential and the random value into the secure hash function. The random value and the secure hash function are the same as those used by the server computer. The inspection device then compares the credential received by the inspection device with the credentials received by the server computer one by one until a match is found or all the credentials from the server computer are compared. If a match exists, the user's card is validated, i.e., the user has paid the fare. After the match is completed, the inspector's device erases the user's credential from its memory.

In various embodiments, since the sensitive payment data of all paid users are converted to secure hash values before being transferred to the inspection device, the inspection device can perform matching and validation without having the plaintext SPDs of all paid users in memory. Thus, only one user's credential being checked is stored in the inspection device in plaintext at one time. Thus, the approaches disclosed can prevent malware, including dictionary attacks, and thereby achieves sensitive payment data (SPD) security in tap-to-phone (TTP) software on commercial-off-the-shelf (COTS) devices. One benefit of this invention is that the inspection device can be a commercial-off-the-shelf smartphone instead of an expensive specially-built system. The inspector's device does not have to be PCI-DSS (Payment Card Industry Data Security Standard) compliant.

FIG. 1 is a schematic diagram that illustrates an exemplary system 100 for revenue inspection in accordance with various embodiments of the disclosure. The system 100 includes a server computer 102, a first device 108 operated by a first user 106, and a second device 112 operated by a second user 110. The first device 108 and a second device 112 can communicate with the server computer 102 over a communication network 104. The first device 108 and the second device 108 may be examples of user devices. While the second device 112 is preferably an off-the-shelf commercial smartphone, it could be a stationary kiosk or terminal in other embodiments.

In some embodiments, the server computer 102 may include a computer or cluster of computers. For example, the server computer 102 can be a large mainframe, a minicomputer cluster, or a group of servers functioning as a unit. As another example, the server computer 102 may be a database server coupled to a Web server. The server computer may comprise one or more computational apparatuses. It may use various computing structures, arrangements, and compilations to serve requests from one or more client computers.

In some embodiments, the communication network 104 may be anyone or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like.

In some embodiments, the first device 108 may be a commercial-off-the-shelf (COTS) smartphone for inspection purposes. The first device 108 may include a reader, a processor, and a computer-readable medium. The reader may include any suitable contact or contactless mode of operation. For example, exemplary readers can include radio frequency (RF) antennas, optical scanners, bar code readers, or magnetic stripe readers to interact with a payment device and/or mobile communication device. A tap-to-phone software may be uploaded to the first device 108 and may provide an interface for the first user 106 to operate the first device 108 to read the second device 112.

In some embodiments, the first user 106 may be an inspector who operates the first device 108, and the second user 110 may be an individual who owns or operates the second device 112. The second user 110 may be asked by the first device 108 to tap the second device 112 against the first device 108. For example, the second user 110 may tap the second device 112 against an NFC (near field communications) reader on the first device 108. In other embodiments, the connection between the first device 108 and the second device 112 may be formed using Bluetooth® or other suitable communication protocol.

In some embodiments, the second device 112 may be a card that contains a credential of the second user 110 associated with the second device 112. The card may be any consumer token supporting payment transactions, whether in the form of a payment chip card, a key fob, a mobile phone, or another form factor. The credential may be any information that serves as reliable evidence of identity and payment history of the second user 110. For example, the credential may indicate whether the second user 110 has paid a ride fare. The credential may be a string of numbers, letters, or any other suitable characters that can serve as confirmation. The credential may include an account number of a credit or debit card used to pay the ride fare.

Figure 2:
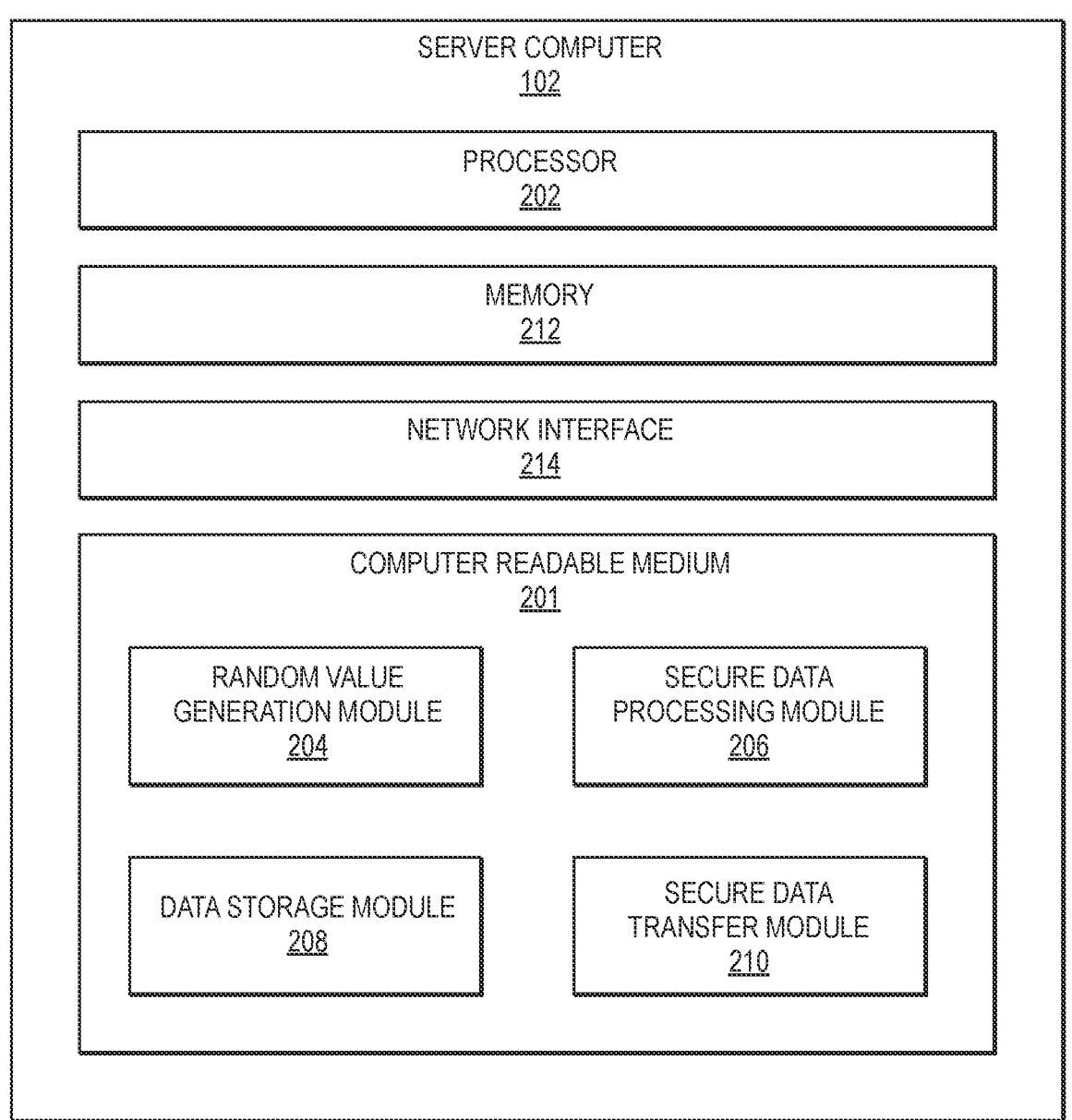
FIG. 2 is a block diagram that illustrates a server computer in accordance with various embodiments of the disclosure.

FIG. 2 is a block diagram that illustrates a server computer 102 in accordance with various embodiments of the disclosure.

The server computer 102 can include a processor 202, a memory 212, a network interface 214, and a computer-readable medium 201 coupled to the processor 202.

The network interface 214 may include an interface that can allow the server computer 102 to communicate with external computers and/or devices. The network interface 214 may enable the server computer 102 to communicate data to and from another device such as an access device. Some examples of the network interface 214 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 214 may include Wi-Fi®. Data transferred via the network interface 214 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 214 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the computer-readable medium 201 may comprise a random value generation module 204, a secure data processing module 206, a data storage module 208, and a secure data transfer module 210.

In some embodiments, the random value generation module 204, in conjunction with the processor 202, generates a random value, also known as "a salt," used in the secure data processing module 206. The salt value may be generated mitted to the first device 108 illustrated in FIG. 1. The salt value does not have to be confidential and may be kept in plain text in an application or during transmission. In some embodiments, the salt value may be stored anywhere. For example, the salt value may be stored and retrieved from a website.

In this regard, the random value generated by the random value generation module 204 is not a secret value and may be shared with may transmit employees operating user devices. In some embodiments, the random value is passed to all user devices of all ticket checking employees on a particular vehicle (e.g., a particular train, ship, or plane). They will all use the random value to generate hashes as described below. Thus, the random value may be changed periodically (e.g., daily or weekly) and may be limited in its distribution (e.g., the same random value is provided to all gates in a terminal, or is provided to all user devices for all employees on a train, is provided to all user devices for all employees working in a transit system, etc.), or time.

In some embodiments, the secure data processing module 206, in conjunction with the processor 202, may process sensitive data such as sensitive payment data (SPD) based on a one-way function such as a hash function. For example, the secure data processing module 206, in conjunction with the processor 202, may generate a first hash value by inputting at least a first credential of a user who paid the fare and the random value into a hash function.

In some embodiments, the SPD may include credentials for a payment account. The credentials may include a PAN (Primary Account Number), payment token, expiration date, an identity of an issuer with which an account is held, etc. The credentials may also include ticket information for an event, data to access a building, transit ticket information, passwords, etc.

In some embodiments, the hash function must use a hash algorithm approved by the National Institute of Standards and Technology (NIST), e.g., SHA-256 (Secure Hash Algorithm SHA-256).

In some embodiments, the hash function may receive input parameters including a random value (e.g., a salt value), a credential (e.g., a PAN (Primary Account Number)), an expiry date of a user's payment card, and a PTO (Public Transit Operator) identification number. See Table 1 below.

TABLE 1

| Input Parameters of a Hash Function | | | |
|---|---|---|---|
| Data | Length | Example | Description |
| Salt | 16 bytes | '33fd67612e21d58e6c62a483 527ad281' | Random value used for One-way function processing of one or more PAN(s). |
| PAN | 10 bytes | '400012345678016fffff' | First pad PAN padded with 'f' in the end to 20 digits, compacting it to 10 bytes hex values. |
| Expiry | 2 bytes | '0625' | Expiry date in MMYY, compacted into 2 bytes hex values. |
| PTO ID | 36 bytes | '5669736120476c6f62616c205 57262616e204d6f62696c6974 792600000000000000000000' ("Visa Global Urban Mobility") | PTO self-assigned identification string, the string is appended with an EOF character (26h), remaining bytes after EOF are filled with zero value ('00'). | using a trusted random number generator source. In a transit context, the salt value may also be generated based on the experience of a transit operator. The salt value may be stored in the memory 212 of the server computer 102 and trans- The input parameters above are concatenated into a 64-byte buffer, and then fed to a hash function. Table 2 below shows examples of the hash function's input parameter values and output (i.e., results).

TABLE 2

| Examples of the Input Parameter Values and Results |
| --- |

Salt = '33fd67612e21d58e6c62a483527ad281'
PAN = 400012345678016
Expiry = 06/25
PTO ID = "Visa Global Urban Mobility"
RESULT =
'bc03b27974470f7a1fc5d0ce1598ea6441eca75db3000802d2119f9362eacb09'
Salt = '33fd67612e21d58e6c62a483527ad281'
PAN = 40001234567801012341
Expiry = 12/26
PTO ID = "Visa Global Urban Mobility"
RESULT =
'ab927375d972b64660b29b3e94f4af1b9d7a93b8827ac2ff1ac2ce1db5050aea'
Salt = '94b1b1f7e290db4f385ba0cb6bb79cde'
PAN = 40001234567801012341
Expiry = 12/26
PTO ID = "Visa Global Urban Mobility"
RESULT =
'7c2d841728abf7967d0ddf0fd3f45f68cdcf43e36a9494f71ca7cdab1fa05caf'
Salt = '94b1b1f7e290db4f385ba0cb6bb79cde'
PAN = 40001234567801012341
Expiry = 12/26
PTO ID = "Visa GUM Line Number 94404"
RESULT =
'65f03bd9f7a3e589c56fd65d1eecbc584014a5e8901cbe1d2a9a456bf86b08c2'

Since the hash function is a one-way function, the hash function's output (i.e., the hash values) cannot be reverted to the input of the hash function (i.e., the SPDs or the credentials). For example, the leaked hash values cannot be reverted to the credentials even if the inspection device is compromised.

The hash function with the input parameters above is designed to prevent dictionary attacks (i.e., brute-force attacks trying many possibilities), known as a vulnerability of hash algorithms.

In some embodiments, the data storage module 208 may store the salt and credentials of individuals who made payment and processed secure data such as hash values.

In some embodiments, the secure data transfer module 210 may transmit processed secure data such as hash values to the first device 108.

The computer-readable medium 201 may also comprise instructions that, when executed by the processor 202, cause the processor 202 to perform operations including: generating, by a server computer, a random value; generating, by the server computer, a plurality of hash values including a first hash value and other hash values, wherein the first hash value is generated by inputting at least a first credential and the random value into a hash function, and the other hash values are generated by inputting at least other credentials and the random value into the hash function; and transmitting, by the server computer, the plurality of hash values including the first hash value to the first device.

Figure 3:
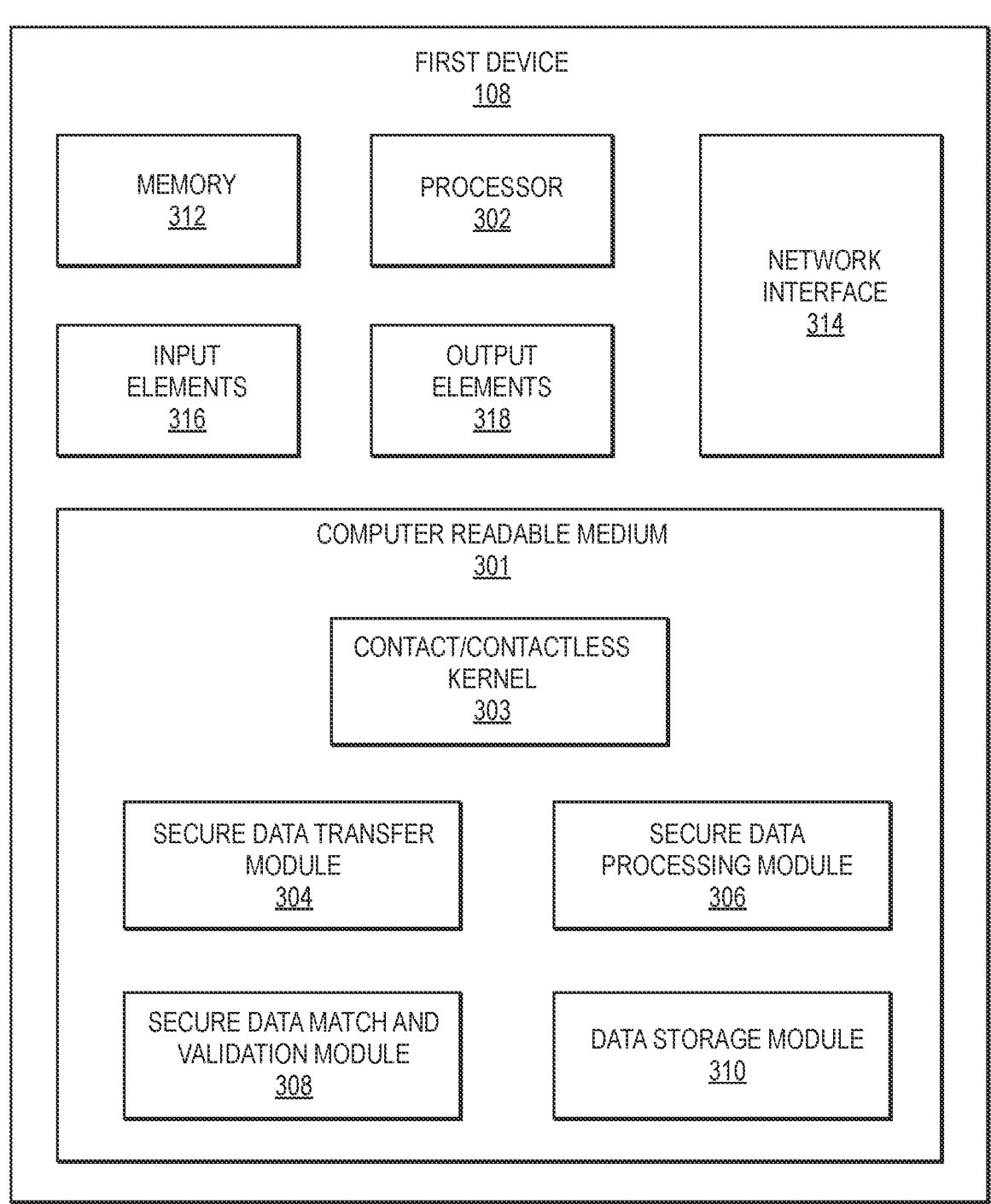
FIG. 3 is a block diagram that illustrates an example first device in accordance with various embodiments of the disclosure.

FIG. 3 is a block diagram that illustrates a first device 108 in accordance with various embodiments of the disclosure.

The first device 108 includes a processor 302, a memory 312, a network interface 314, input elements 316, output elements 318, and a computer-readable medium 301 coupled to the processor 302. The network interface 314 may have the same or different features as the network interface 214 in FIG. 2 and may also have long and short-range antennas for long and short-range communications.

Examples of input elements 316 can include a touch-screen, a keyboard, a microphone, accelerometers, etc. Examples of output elements 318 include display screens, speakers, etc.

The computer-readable medium 301 can include a contact/contactless kernel 303, a secure data transfer module 304, a secure data processing module 306, a secure data match and validation module 308, and a data storage module 310.

The contact/contactless kernel 303 may be a set of functions that provides the processing logic and data used to allow the first device 108 to perform contact or contactless transaction. The contact/contactless kernel 303 in conjunction with the processor 302 may read a second credential from the second device 112.

The secure data transfer module 304, in conjunction with the processor 302, may receive processed secure data such as hundreds or thousands of hash values from the server computer 102. The hash values may be obtained based on hundreds or thousands of credentials.

The secure data processing module 306, in conjunction with the processor 302, may process the second credential received from the second device 112 operated by the second user 110. In some embodiments, the secure data processing module 306 may generate a second hash value by inputting the same salt value and the same hash function used to generate the first hash value in the secure data processing module 206.

The secure data match and validation module 308, in conjunction with the processor 302, compares the first hash value and the second hash value. If the first hash value and the second hash value match, the secure data match and validation module 308 confirms that the second user 110 has paid the fare for service received and validates an action of the second user 110. The action may be riding a transportation vehicle.

The data storage module 310, in conjunction with the processor 302, may store the hundreds or thousands of hash values received by the secure data transfer module 304 in the memory 312. The data storage module 310 may also store the second credential read from the second device 112 in the memory 312, but may remove or delete the second credential from the memory after the validation is completed.

The computer-readable medium 301 can comprise instructions that, when executed by the at least one processor, cause the first device to perform operations comprising:

receiving, by the first device from a server computer, a first hash value along with a plurality of other hash values, and a random value, wherein the first hash value is generated by inputting at least a first credential and the random number into a hash function; reading, by the first device, a second credential from a second device operated by a second user; generating, by the first device, a second hash value by inputting at least the second credential and the random value into the hash function; comparing, by the first device, the first hash value and the second hash value, and determining that the first hash value and the second hash value match; and validating, by the first device, an action of the second user when the first hash value and the second hash value match.

Figure 4:
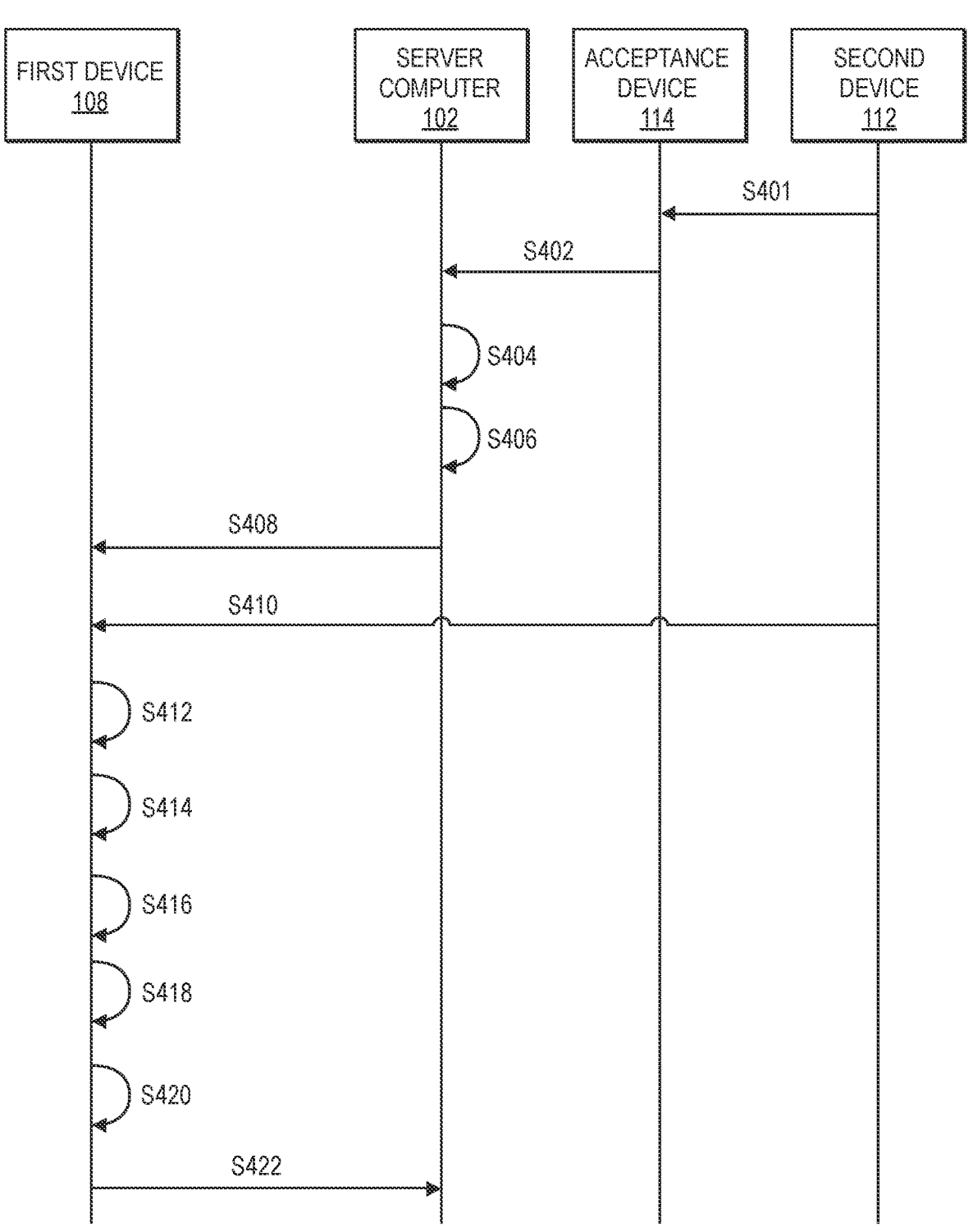
FIG. 4 is a swim-lane flow diagram that illustrates methods for secure data processing in accordance with various embodiments of the disclosure.

FIG. 4 is a swim-lane flow diagram illustrating methods for secure data processing using the system and components illustrated in FIGS. 1-3, in accordance with various embodiments of the disclosure. Some details of the methods (e.g., specific hashing details) are described above, but can be part of the steps described below.

In the context of a transit transaction, a second user operating a second device 112 may purchase a ticket to ride on a train. The second device 112 can be in the form of a card, such as a payment card (e.g., a credit or debit card). At step S401, the second user can present the second device 112 or a credential associated with the second device 112 to an acceptance device 114 (e.g., a kiosk at a transit station, a POS terminal at a ticket counter, a payment server, etc.) associated with a transit operator. The acceptance device 114 can read or otherwise receive a credential such as a PAN (primary account number) from the second device 112. The credential may be of any suitable length, but can be at least 10 bytes to help to ensure that any hash generated using the credential is secure. A payment amount associated with the requested ticket can also be input into the acceptance device 114.

At step S402, the acceptance device 114 can transmit the credential and the transaction amount to the server computer 102. At this point, the server computer 102 can store the credential for later payment authorization, or it could seek authorization for payment of the ticket. For example, the server computer 102 can generate an authorization request message and then transmit it to an issuer computer that issued the credential via an acquirer computer and a payment processing network. The issuer computer can authorize the transaction if the account associated with the credential has sufficient funds or credit. The issuer computer can then transmit an authorization response message back to the server computer 102 and the acceptance device 114 via the payment processing network and acquirer computer. Later, a clearing and settlement process between the issuer computer, the payment processing network, and the acquirer computer can take place. In this stage, actual funds are transferred from the account of the second user to the account of the transit operator.

At step S404, the server computer 102 generates a random value (i.e., a salt value) using the random value generation module 204. In some embodiments, the random value can be relatively long (e.g., at least about 16 bytes long) to help ensure that the resulting hash that is formed from the random value is secure.

At step S406, after generating the random value, the server computer 102 generates a first hash value by inputting at least the first credential and the random value into a hash function. In some embodiments, other data such as a transit operator number that identifies the transit agency or other entity can be input into the hash function. In other embodiments, other data such as an expiration date of the second device 112 can be input into the hash function as well. All of the input data can be concatenated together and then input into the hash function. In some embodiments the hash value that is output from the hash function is of sufficient length that it is not practically vulnerable to a dictionary attack. In some embodiments, the hash can be at least 32 bytes long.

Note that the server computer 102 can process other credentials from other user devices of other users other than the credential from the second device 112. The server computer 102 can generate other hash values using other credentials, and the random value and the transit operator number used in the first hash value. Although the random value and the transit operator number are used to create the first hash value and the other hash values, each hash value generated is very different since a different credential is used to create each hash value.

At step S408, the server computer 102 transmits the first hash value and the random value to the first device 108 operated by a first user 106. If the first hash value is created using a transit operator number, that number may also be transmitted by the server computer 102 to the first device 108 if the first device does not already have it. The server computer 102 may also transmit other hash values associated with other credentials of other users to the first device 108 along with the first hash or separate from the first hash.

The server computer 102 may repeat the steps S402-S408 for hundreds or thousands of users, receive hundreds or thousands of corresponding credentials and generate hundreds or thousands of corresponding hash values. At some point, the first device 108 may store the first hash value and other hash values.

After the second user has paid for the ticket, the second user 110 may be on board the train. The employee of the train (i.e., the first user) may have the first device 108 with the stored hashes and may use it to verify that the passengers on the train have paid for their tickets. The train employee then approaches the second user 110 and asks that they present their second device 112 to verify that they have paid for their ticket.

At step S410, the second user 110 takes the second device 112, which may be a payment card, and then interacts (e.g., taps or inserts) the second device 112 with the first device 108. The first device 108 reads a second credential from the second device 112. The second credential may be the same as the first credential that is discussed above in step S401. Thus, the terms "first" and "second" may be used to designate the same credential that is used at different points in time.

At step S412, the first device 108 then stores the second credential in the memory of the first device.

At step S414, the first device 108 generates a second hash value by inputting at least the second credential and the random value into the hash function. If the transit operator number is present, it is also input into the hash function. As explained above, all input data can be concatenated together, and the concatenated data may be input into the hash function.

After the second hash is generated, at step S416, the first device 108 compares the second hash value to a set of hash values, including the first hash values and the plurality of other hash values stored on the first device 108.

At step S418, at some point, the first device 108 determines that the first hash value and the second hash value match. The first device 108 can also determine that the first hash does not match the other hash values. Once a match is found, the first device 108 confirms that the second user 110 has paid the transit fare and validates the action of the second user 110. In this example, the action is that of the second user riding the train. The first device 108 may have a display screen showing that the second user has paid for the ticket, allowing the second user to remain on the train.

After determining that a match is found, at step S420, the first device 108 can erase or delete the second credential from the memory of the first device 108. By deleting the second credential from memory shortly after validation, first device 108 only stores one credential in memory at a time.

At step S422, the first device 108 can transmit a signal to the server computer 102 that the ticket has been used. The transit employee can then take the first device 108 and verify that the next passenger paid for his or her ticket.

Embodiments of the invention have several advantages. For example, embodiments of the invention can protect sensitive information such as personal credentials by processing the credentials using a secure hash function. Such credentials are therefore not subject to malicious data breaches such as dictionary attacks. Further, embodiments of the invention can allow an inspector to use a commercial off-the-shelf smartphone instead of an expensive specially-built PCI-DSS (Payment Card Industry Data Security Standard) compliant system. Thus, embodiments of the invention make the inspection more convenient, as the smartphone is cheaper and easy to acquire. Furthermore, since the tap-to-phone software uploaded to different smartphones is the same, the inspection process is the same for all transit operators across different geographical regions, e.g., cities and countries.

Any software components or functions described in this application may be implemented as software code executed by a processor using any suitable computer language such as Java, C, C++, C#, Objective-C, Swift, or scripting languages such as Perl or Python. The software code may be stored as a series of instructions or commands on a computer-readable medium for storage and/or transmission. The computer-readable medium may include random access memory (RAM), a read-only memory (ROM), a magnetic medium such as a hard-drive or a floppy disk, or an optical medium such as a CD (Compact Disk) or DVD (Digital Versatile Disk), flash memory, and the like. The computer-readable medium may be any combination of such storage or transmission devices.

Such programs may also be encoded and transmitted using carrier signals adapted for transmission via wired, optical, or wireless networks conforming to various protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g., a hard drive, a CD, or an entire computer system) and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. Therefore, the scope of the invention should be determined not with reference to the above description but instead should be determined with reference to the pending claims along with their full scope or equivalents. For example, although transit scenarios are specifically described, embodiments of the invention are not limited thereto. Embodiments can be used in any suitable situation in which access to a resource such as a secure location is needed or desired.

One or more features from any embodiment may be combined with one or more features of any other embodiment without departing from the scope of the invention.

As used herein, the use of "a," "an," or "the" is intended to mean "at least one" unless expressly indicated to the contrary.

What is claimed is:

1. A method, comprising:

receiving, by a first device from a server computer, a first hash value along with a plurality of other hash values, a public transit operator identification number and a random value, wherein the first hash value is generated by inputting at least a first credential, the random value, the public transit operator identification number and an expiration date associated with a second device into a hash function performed by the server computer, and wherein the public transit operator identification number identifies a public transit operator;

reading, by the first device, a second credential from the second device operated by a second user;

generating, by the first device, a second hash value by inputting at least the second credential, the public transit operator identification number, the expiration date associated with the second device, and the random value into the hash function;

comparing, by the first device, the second hash value to the plurality of other hash values and determining that the second hash value and the plurality of other hash values do not match;

comparing, by the first device, the first hash value and the second hash value, and determining that the first hash value and the second hash value match; and validating, by the first device, an action of the second user when the first hash value and the second hash value match.

2. The method of claim 1, further comprising:

storing, by the first device, the second credential in memory of the first device after reading the second credential from the second device and before generating the second hash value; and erasing, by the first device, the second credential from the memory of the first device after validating the action.

3. The method of claim 2, further comprising: at most one credential exists in the memory of the first device at one time.

4. The method of claim 1, wherein:

the second device is a card; and the first device is an NFC (Near-Field Communication) smartphone capable of reading the second device.

5. The method of claim 1, wherein the random value is determined by a random number generator in the server computer and is used by the server computer to generate hash values for a specific period or a transportation line.

6. The method of claim 1, wherein the random value is at least 16 bytes long.

7. The method of claim 1, wherein each of the first hash value, the second hash value, and the plurality of other hash values satisfies one or more data security requirements, including resilience against a dictionary attack.

8. The method of claim 1, wherein the hash function is a SHA256 hash function.

9. The method of claim 1, wherein the first hash value and the second hash value are each at least 32 bytes long.

10. The method of claim 1, wherein the first credential and the second credential consists of a same value.

11. The method of claim 10, wherein the first credential and the second credential are each at least 10 bytes long.

12. A first device, comprising:

at least one processor; and a non-transitory computer-readable medium, the non-transitory computer-readable medium including instructions that, when executed by the at least one processor, cause the first device to perform operations comprising:

receiving, by the first device from a server computer, a first hash value along with a plurality of other hash values, a public transit operator identification number and a random value, wherein the first hash value is generated by inputting at least a first credential, the random value, the public transit operator identification number and an expiration date associated with a second device into a hash function performed by the server computer, and wherein the public transit operator identification number identifies a public transit operator;

reading, by the first device, a second credential from the second device operated by a second user;

generating, by the first device, a second hash value by inputting at least the second credential, the public transit operator identification number, and the expiration date associated with the second device, and the random value into the hash function;

comparing, by the first device, the second hash value to the plurality of other hash values and determining that the second hash value and the plurality of other hash values do not match;

comparing, by the first device, the first hash value and the second hash value, and determining that the first hash value and the second hash value match; and validating, by the first device, an action of the second user when the first hash value and the second hash value match.

13. A method, comprising:

generating, by a server computer, a random value;

generating, by the server computer, a plurality of hash values including a first hash value and other hash values, wherein the first hash value is generated by inputting at least a first credential, the random value, an expiration date associated with a second device and a public transit operator identification number into a hash function, wherein the public transit operator identification number identifies a public transit operator, and the other hash values are generated by inputting at least other credentials, the random value and the public transit operator identification number into the hash function; and transmitting, by the server computer, the public transit operator identification number along with the plurality of hash values including the first hash value and the other hash values to a first device, wherein the first device thereafter performs operations comprising:

receiving, from the server computer, the public transit operator identification number and the plurality of hash values including the first hash value and the other hash values;

reading a second credential from the second device operated by a second user;

generating a second hash value by inputting at least the second credential, the public transit operator identification number, the expiration date associated with the second device, and the random value into the hash function;

comparing the second hash value to the other hash values and determining that the second hash value and the other hash values do not match;

comparing the first hash value and the second hash value, and determining that the first hash value and the second hash value match; and validating an action of the second user when the first hash value and the second hash value match.

14. The method of claim 13, wherein the server computer is operated by a transit agency.

15. The method of claim 13, wherein the first device is a mobile phone and the second device is a card.

16. The method of claim 13, wherein the action is riding a transportation vehicle by a second user of the second device.

* * * * *